(12) United States Patent
Marinet et al.

(10) Patent No.: US 10,585,738 B2
(45) Date of Patent: *Mar. 10, 2020

(54) METHOD AND DEVICE FOR FAULT DETECTION

(71) Applicants: Proton World International N.V., Zaventem (BE); STMicroelectronics (Rousset) SAS, Rousset (FR)

(72) Inventors: Fabrice Marinet, Chateauneuf le Rouge (FR); Jean-Louis Modave, Ottignies (FR); Gilles Van Assche, Woluwe-St-Lambert (BE); Ronny Van Keer, Hoeilaart (BE)

(73) Assignees: PROTON WORLD INTERNATIONAL N.V., Amsterdam (NL); STMICROELECTRONICS (ROUSSET) SAS, Rousset (FR)

( * ) Notice: Subject to any disclaimer, the term of this patent is extended or adjusted under 35 U.S.C. 154(b) by 88 days.

This patent is subject to a terminal disclaimer.

(21) Appl. No.: 14/996,107

(22) Filed: Jan. 14, 2016

(65) Prior Publication Data

US 2016/0124796 A1 May 5, 2016

Related U.S. Application Data

(63) Continuation of application No. 13/715,157, filed on Dec. 14, 2012, now Pat. No. 9,311,477.

(30) Foreign Application Priority Data

Dec. 15, 2011 (FR) ..................... 11 61673

(51) Int. Cl.
*G06F 11/00* (2006.01)
*G06F 11/07* (2006.01)
(Continued)

(52) U.S. Cl.
CPC .......... *G06F 11/079* (2013.01); *G06F 11/006* (2013.01); *G06F 11/073* (2013.01);
(Continued)

(58) Field of Classification Search
CPC ... G06F 11/079; G06F 11/0751; G06F 11/073
(Continued)

(56) References Cited

U.S. PATENT DOCUMENTS 6,651,148 B2 11/2003 Widdup
7,111,126 B2 9/2006 Biles et al.
(Continued)

FOREIGN PATENT DOCUMENTS

FR 2 418 015 A1 12/2003
FR 2 919 739 A1 2/2009

OTHER PUBLICATIONS

Wikipedia segmentation page of date Nov. 5, 2011, retrieved from https://web.archive.org/web/20111105213650/https://en.wikipedia.org/wiki/Segmentation_fault.*
(Continued)

*Primary Examiner* — Yair Leibovich
(74) *Attorney, Agent, or Firm* — Seed Intellectual Property Law Group LLP

(57) ABSTRACT

The disclosure concerns a method implemented by a processing device. The method includes performing a first execution by the processing device of a computing function based on one or more initial parameters stored in a first memory device. The execution of the computing function generates one or more modified values of at least one of the initial parameters, wherein during the first execution the one or more initial parameters are read from the first memory device and the one or more modified values are stored in a second memory device. The method also includes performing a second execution by the processing device of the
(Continued)

computing function based on the one or more initial parameters stored in the first memory device.

20 Claims, 7 Drawing Sheets

(51) Int. Cl.
*G06F 21/55* (2013.01)
*G06F 21/75* (2013.01)

(52) U.S. Cl.
CPC ........ *G06F 11/0751* (2013.01); *G06F 21/554* (2013.01); *G06F 21/755* (2017.08); *G06F 2207/7219* (2013.01)

(58) Field of Classification Search
USPC .......................................................... 714/37
See application file for complete search history.

(56) References Cited

U.S. PATENT DOCUMENTS

| | | | |
|---|---|---|---|
| 7,848,515 | B2 | 12/2010 | Dupaquis et al. |
| 7,856,523 | B2 | 12/2010 | Bittner, Jr. |
| 8,688,995 | B2 | 4/2014 | Teglia |
| 2001/0016927 | A1 | 8/2001 | Poisner |
| 2005/0157871 | A1 | 7/2005 | Komano et al. |
| 2006/0045264 | A1 | 3/2006 | Kocher et al. |
| 2006/0212770 | A1 | 9/2006 | Fischer et al. |
| 2007/0019805 | A1 | 1/2007 | Karpovsky et al. |
| 2007/0177720 | A1 | 8/2007 | Bevan et al. |
| 2007/0186036 | A1 | 8/2007 | Bittner, Jr. |
| 2007/0188355 | A1 | 8/2007 | Baek |
| 2007/0286413 | A1 | 12/2007 | Derouet |
| 2009/0044265 | A1 | 2/2009 | Ghosh et al. |
| 2009/0254761 | A1 | 10/2009 | Thiebeauld De La Crouee et al. |
| 2009/0323956 | A1 | 12/2009 | Tsunoo et al. |
| 2010/0310068 | A1* | 12/2010 | Fischer ................ H04N 7/1675 380/43 |
| 2011/0041013 | A1 | 2/2011 | Ingimundarson |
| 2011/0072222 | A1* | 3/2011 | Wagner ................ G06F 21/556 711/155 |
| 2011/0119532 | A1 | 5/2011 | Teglia |
| 2011/0119762 | A1 | 5/2011 | Teglia |
| 2011/0225432 | A1 | 9/2011 | Trichina |
| 2011/0296198 | A1* | 12/2011 | Motoyama ............... H04L 9/003 713/189 |
| 2012/0060038 | A1* | 3/2012 | Trimberger ........... G06F 21/755 713/189 |
| 2013/0007881 | A1* | 1/2013 | Liem ........................ G06F 21/14 726/22 |
| 2013/0103972 | A1 | 4/2013 | Özer et al. |
| 2013/0290594 | A1 | 10/2013 | Callahan et al. |
| 2013/0305098 | A1 | 11/2013 | Keromytis et al. |
| 2014/0301553 | A1 | 10/2014 | Salgado et al. |
| 2015/0130502 | A1 | 5/2015 | La Rosa |
| 2017/0344310 | A1 | 11/2017 | Peeters et al. |

OTHER PUBLICATIONS

Wikipedia "computing page" of date Nov. 12, 2011, retrieved from https://web.archive.org/web/20111127053222/https://en.wikipedia.org/wiki/Computing.*

Wikipedia "checksum" page of date Oct. 1, 2011, retrieved from https://web.archive.org/web/20111001065510/https://en.wikipedia.org/wiki/Checksum.*

Wikipedia "Augmented assignment" page from date Oct. 17, 2011, retrieved using the WayBackMachine from https://web.archive.org/web/20111017200601/https://en.wikipedia.org/wiki/Augmented_assignment (Year: 2011).*

Wikipedia "Iteration" page from date Oct. 8, 2011, retrieved using the WayBackMachine from https://web.archive.org/web/20111008205614/https://en.wikipedia.org/wiki/Iteration (Year: 2011).*

Bar El et al., "The Sorcerer's Apprentice Guide to Fault Attacks," *Proceedings of the IEEE* 94(2):370-382, Feb. 2006.

Bar-El et al., "The Sorcerer's Apprentice Guide to Fault Attacks," retrieved from http://web.archive.org/web/20041016071838/eprint.iacr.org/2004/100, Oct. 16, 2004, XP002329915, 13 pages.

Bertoni et al., "Error Analysis and Detection Procedures for a Hardware Implementation of the Advanced Encryption Standard," *IEEE Transaction on Computers* 52(4):492-505, Apr. 2003.

French Search Report, dated Jul. 13, 2012 for French application No. 1161673, 7 pages.

Karpovsky et al., "Robust Protection against Fault-Injection Attacks on Smart Cards Implementing the Advanced Encryption Standard," Proceedings of the 2004 International Conference on Dependable Systems and Networks, Jun. 28-Jul. 1, 2004, Piscataway, NJ, 9 pages.

Karri et al., "Concurrent Error Detection Schemes for Fault-Based Side-Channel Cryptanalysis of Symmetric Block Ciphers," *IEEE Transactions on Computer-Aided Design of Integrated Circuits and Systems* 21(12):1509-1517, Dec. 2002.

Moratelli, Carlos R. et al., "A Cryptography Core Tolerant to DFA Fault Attacks," Journal Integrated Circuits and Systems 2007; v.2, n. 1, pp. 14-21.

Wikipedia, "processor register," retrieved from https://web.archive.org/web/20111107124250/http://en.wikipedia.org/wiki/Processor_register, on Nov. 7, 2011, 3 pages.

U.S. Appl. No. 15/331,470, filed Oct. 21, 2016, Secured Execution of an Algorithm.

Bidgoli (ed.), *Handbook of Information Security: Threats, Vulnerabilities, Prevention, Detection, and Management*, John Wiley & Sons, Inc., Hoboken, New Jersey, USA, 2006, pp. 236-238. (5 pages).

Kim et al., "Introduction to fault attacks," BCRYPT course on embedded security and application, May 19, 2009, 92 pages.

Krzyzanowski, "Memory Management," Mar. 25, 2012, URL= https://www.cs.rutgers.edu/~pxk/416/notes/09-memory.html, download date Sep. 4, 2018, 17 pages.

Lomne, "Countermeasures against Fault Attacks," TRUDEVICE Training School on Trustworthy Manufacturing and Utilization of Secure Devices, Jul. 14, 2014, Lisbon, Portugal, 60 pages.

Murray, "Input/Output and Interfacing," University of Oxford, 2nd Year A2 Microcontroller Systems Course, Lecture 4, 2014, 18 pages.

Shaffer, *Data Structures and Algorithm Analysis*, Edition 3.2 (C++ Version), Sep. 15, 2011, Chapter 3, "Algorithm Analysis," pp. 55-91. (38 pages).

* cited by examiner

METHOD AND DEVICE FOR FAULT DETECTION

CROSS-REFERENCE TO RELATED APPLICATIONS

The present application is a divisional of U.S. patent application Ser. No. 13/715,157, filed on Dec. 14, 2012, which claims priority to French Patent Application No. 1161673, filed on Dec. 15, 2011, all of which are hereby incorporated by reference in their entirety.

BACKGROUND

Technical Field

The present disclosure relates to the field of fault detection, and in particular to a device and method for executing a computing function protected against fault attacks.

Description of the Related Art

Integrated circuits may comprise circuitry that is considered sensitive in view of the security of the data that it processes, such as authentication keys, signatures, etc., or of the algorithms it uses, such as encryption or decryption algorithms. Such information should not be communicated to or otherwise be detectable by third parties or unauthorized circuits.

A common process for fraudulently discovering information manipulated by an integrated circuit involves detecting, within the circuit, the zones that are used during the processing of that information. For this, the circuit is activated or otherwise placed in a functional environment, and data to be processed by the circuit is introduced at an input. Then, while the data is processed, for example, the surface of integrated circuit is swept by a laser to inject faults in the functioning of the circuit, and in particular to flip the voltage state stored at one or more nodes of the circuit. While analyzing in parallel the outputs of the circuit, the zones that are used to process the data may be determined. Having localized such zones, the pirate can then concentrate the attacks on these zones in order to discover the secret information.

The injection of faults can also be used to bypass security checks or to infer secret information through the modification of the data being processed.

One solution for protecting against faults attacks is to provide two processing devices arranged to operate in parallel on the same input data. By comparing the results generated by these two devices, the injection of a fault can be detected. However, such a solution comes at a relatively high hardware cost.

An alternative solution that avoids the use of two processing devices is to execute the sensitive function twice using the same processing device and with the same input data. However, a drawback of existing implementations of this type of solution is that they are implemented with relatively high memory resources.

BRIEF SUMMARY

It is an aim of embodiments described herein to at least partially address one or more needs in the prior art.

According to one aspect of the present disclosure, there is provided a method implemented by a processing device comprising: performing a first execution by said processing device of a computing function based on one or more initial parameters stored in a first memory device, the execution of said computing function generating one or more modified values of at least one of said initial parameters, wherein during said first execution said one or more initial parameters are read from said first memory device and said one or more modified values are stored in a second memory device; and performing a second execution by said processing device of said computing function based on said one or more initial parameters stored in said first memory device.

According to one embodiment, during said second execution said one or more initial parameters are read from said first memory device and said one or more modified values are stored in said first memory device.

According to another embodiment, before performing said first execution, the method further comprises storing said one or more initial parameters in said first memory device.

According to another embodiment, the method further comprises, during said first execution of said computing function: receiving by said second memory device a write instruction associated with a first address in said first memory device and with a first data value; storing said first data value in said second memory device and storing said first address as an indexing value in said second memory device in association with said first data value; receiving by said second memory device a read instruction associated with said first address; locating said first data value in said second memory device based on said first address; and outputting said first data value from said second memory device.

According to another embodiment, the method further comprises comparing at least one value generated during said first execution of said computing function with at least one value generated during said second execution of said computing function.

According to another embodiment, said comparing operation comprising reading said at least one value generated during said first execution from said second memory device and reading said at least one value generated during said second execution from said first memory device.

According to another embodiment, the method further comprises: computing a first verification value based on a plurality of values generated by said first execution of said computing function; computing a second verification value based on a plurality of values generated by said second execution of said computing function; comparing said first and second verification values.

According to another embodiment, said first verification value comprises the sum of said plurality of values generated by said first execution and said second verification value comprises the sum of said plurality of values generated by said second execution.

According to another embodiment, said first verification value is computed as a cyclic redundancy check based on said plurality of values generated by said first execution, and said second verification value is computed as a cyclic redundancy check based on said plurality of values generated by said second execution.

According to a further aspect of the present disclosure, there is provided a method of detecting the occurrence of a fault attack during the execution of a computing function, comprising the above method.

According to a further aspect of the present disclosure, there is provided a computing device comprising: a processing device configured to perform first and second executions of a computing function based on one or more initial parameters, said computing function generating one or more modified values of at least one of said initial parameters; a first memory device configured to store said at least one initial parameter; and a second memory device coupled to said processing device and to said first memory device; wherein said processing device is configured to read, during said first execution, said one or more initial parameters from said first memory device and to store, during said first execution, said one or more modified values in said second memory device.

According to one embodiment, said processing device is configured to read, during said second execution, said one or more initial parameters from said first memory device and to store, during said second execution, said one or more modified values in said first memory device.

According to another embodiment, said second memory device comprises an enable input coupled to said processing device, and said second memory device is configured to forward, when disabled, all write and read instructions to said first memory device.

According to another embodiment, said second memory device is configured to receive, during said second execution, read instructions from said processing device and to forward said read instructions to said first memory device if they relate to one of said initial parameters.

According to another embodiment, the computing device further comprises a verification block adapted to compare at least one value generated during said first execution of said computing function with at least one value generated during said second execution of said computing function.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn are not intended to convey any information regarding the actual shape of the particular elements and have been solely selected for ease of recognition in the drawings.

The foregoing and other purposes, features, aspects and advantages of embodiments of the present disclosure will become apparent from the following detailed description of embodiments, given by way of illustration and not limitation with reference to the accompanying drawings, in which.

DETAILED DESCRIPTION

Throughout the following description, only those aspects useful for an understanding of the embodiments of the present disclosure will be described in detail. Other aspects, such as the particular computing functions executed by the processing device, have not been described in detail, it being apparent to those skilled in the art that the embodiments described herein are applicable to a broad range of computing functions, for cryptographic applications or other types of applications.

Figure 1:
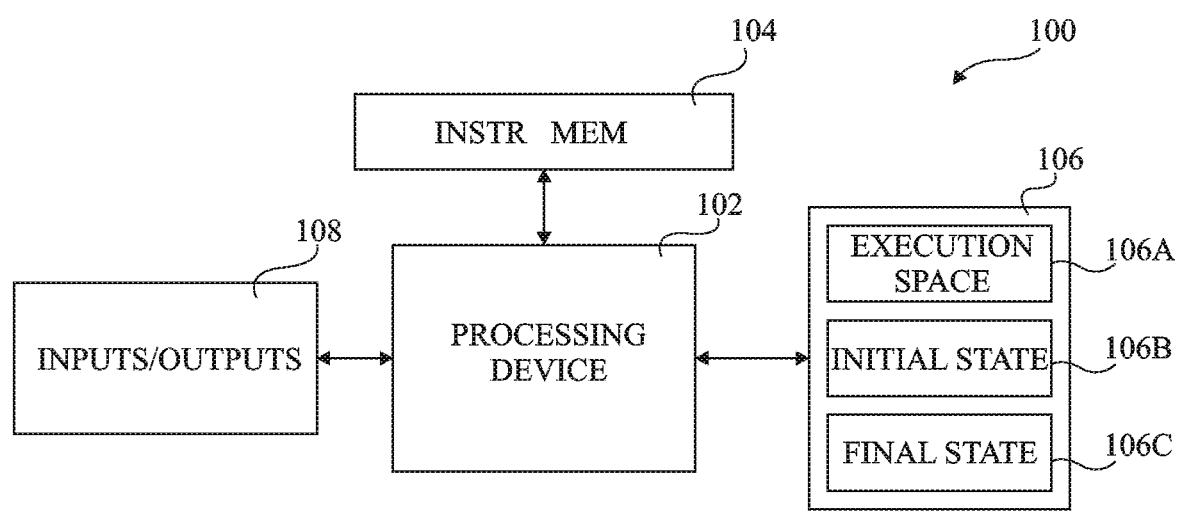
FIG. 1 illustrates a computing device according to an example embodiment.

FIG. 1 illustrates an example of a computing device 100 comprising a processing device 102 for executing a computing function, based on instructions stored in an instruction memory 104. A memory device 106 is coupled to the processing device, and comprises a memory area 106A providing an execution space used during the execution of the computing function, a memory area 106B storing a copy of the initial state of memory area 106A, and a memory area 106C storing a final state of memory area 106A.

One or more inputs/outputs 108 may be provided, such as keyboards or keypads, displays, etc.

Figure 2:
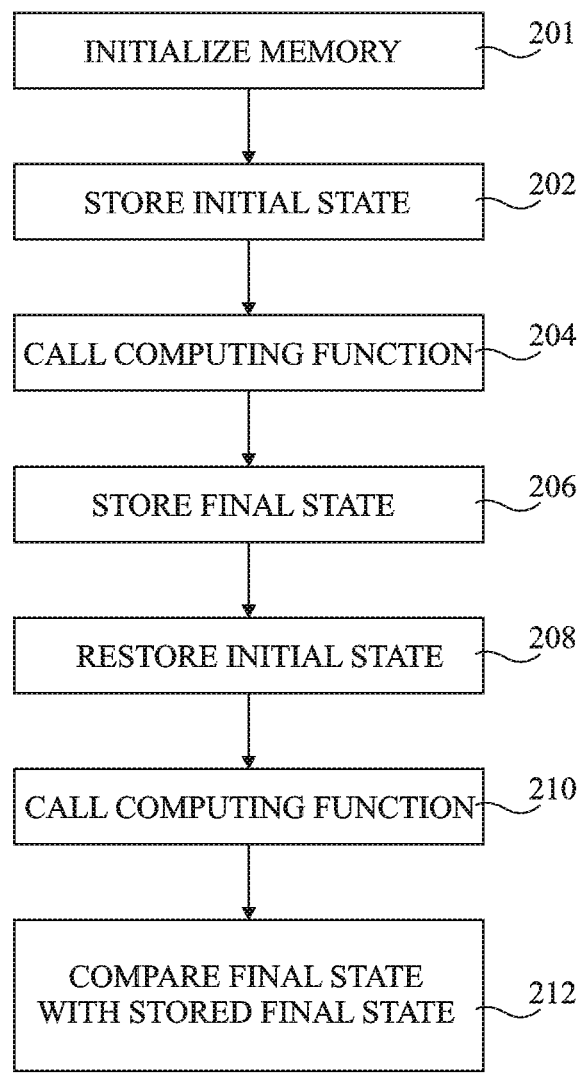
FIG. 2 is a flow diagram showing operations in a method of executing a computing function according to an example embodiment.

FIG. 2 is a flow diagram showing operations performed during the execution of the computing function, which is executed twice using the apparatus 100 of FIG. 1, according to a solution that has been proposed for detecting a fault attack.

In a first operation 201, the memory 106, and in particular the memory area 106A, is initialized. In particular, initial parameters to be used during the execution of the computing function are loaded in the memory area 106A. These parameters may include certain data values used during the computing function, which could be predetermined values, and/or values received on inputs of the computing device 100. They could also include one or more cryptographic keys.

In a subsequent operation 202, the initial state of the execution space 106A is copied to the memory area 106B, including the initial parameters.

In a subsequent operation 204, the computing function is called, which involves loading and executing instructions from the instruction memory 104, and will result in one or more data values being read from and written to the execution space provided by memory area 106A.

In a subsequent operation 206, after the computing function has been executed, the final state present in memory area 106A is stored in the memory area 106C.

The computing function is then executed for a second time. As an initial operation 208 of the second execution, the initial state as stored in memory area 106B is restored in the execution space 106A.

In a subsequent operation 210, the computing function 210 is called again, involving loading and executing the instructions again from the instruction memory 104, and will again result in one or more data values being read from and written to the execution space provided by memory area 106A.

In a subsequent operation 212, the new final state present in the memory area 106A is compared to the final state stored in memory area 106C, and any difference between the data values of these states would indicate the presence of a fault.

A drawback of the process of FIG. 2 is that, due to the concurrent use of the three memory areas 106A, 106B and 106C, the memory 106 should be of a relatively large size.

Figure 3:
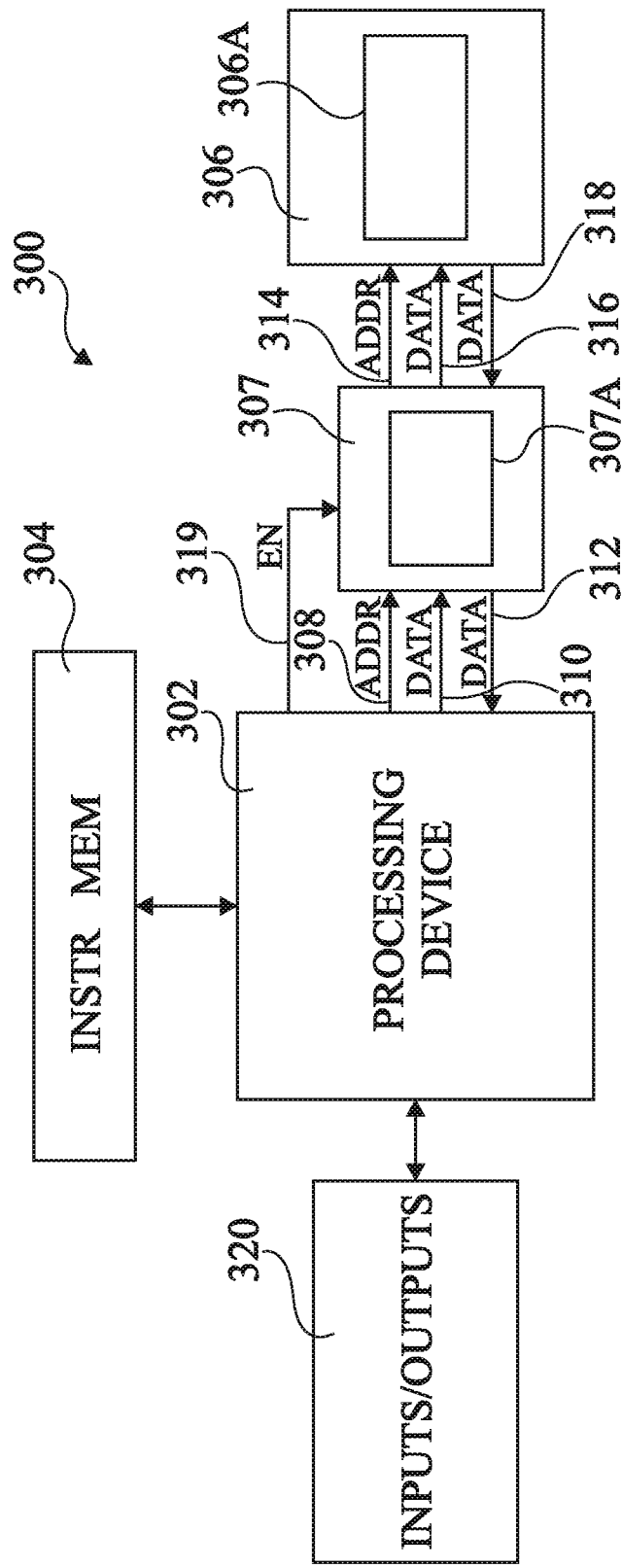
FIG. 3 illustrates a computing device according to an embodiment of the present disclosure.

FIG. 3 illustrates a computing device 300 according to an embodiment of the present disclosure.

Device 300 comprises a processing device 302, which is coupled to an instruction memory 304 storing instructions of a computing function to be executed by the processing device 302. A memory device 306 comprises a memory area 306A, and an intermediate memory device 307 is coupled between the processing device 302 and the memory device 306, and comprises a memory area 307A. In particular, memory device 307 receives address (ADDR) values on lines 308 for read operations, and address and data (DATA) values on line 308 and 310 for write operations, from the processing device 302. Read data is provided on lines 312 to the processing device 302. Furthermore, memory device 307 forwards address values for read operations on lines 314, and address and data values on lines 314 and 316 for write operations. Read data is received by memory device 307 from memory device 306 on lines 318. Memory device 307 for example comprises an enable input receiving an enable signal EN on line 319 from processing device 302.

As with the embodiment of FIG. 1, the computing device 300 may comprise one or more inputs/outputs, labeled 320 in FIG. 3.

Figure 4A:
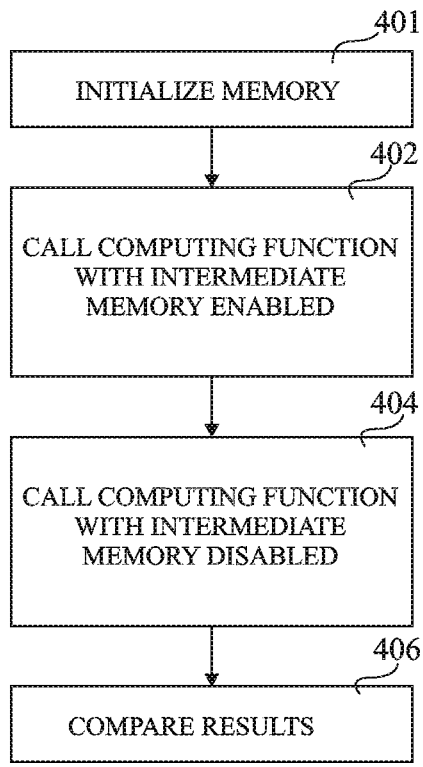
FIG. 4A is a flow diagram showing operations in a method according to an embodiment of the present disclosure.

Operation of the computing device 300 will now be described in more detail with reference to the flow diagram of FIG. 4A. The operations of FIG. 4A are for example implemented under the control of the processing device 302.

In a first operation 401, the memory 306 is initialized. In particular, as described above with reference to operation 201 of FIG. 2, initial parameters to be used during the execution of the computing function are loaded in the memory area 306A. These parameters may include certain data values used during the computing function, some of which could be predetermined values, and/or values received by one or more inputs 320 of the computing device 300. They could also include one or more cryptographic keys. Further examples of the initial parameters include all data forming part of the memory space used by the computing function, such as global variables and local variables.

In a subsequent operation 402, the computing function is called with the intermediate memory 307 enabled via line 319. Execution of the computing function involves loading and executing instructions from the instruction memory 304, and will result in the initial parameters stored in memory area 306A being read, and one or more modified values of the parameters being generated.

With the intermediate memory 307 enabled, all memory operations originating from the processing device will be first processed by the intermediate memory 307. Certain write operations, at least those relating to the initial parameters stored in memory area 306A, are not written to memory area 306A but are instead written to the memory area 307A. In particular, the memory 307A is for example an associative memory. An associative memory is one in which the stored data values are each associated with a further indexing value, and this indexing value is used, during a read operation, to locate the stored data value to be read. Thus, if a write operation of a data value $D_1$ targets a memory address $ADDR_1$ in memory area 306A, the data value $D_1$ is for example written to memory area 307A, and the address $ADDR_1$ is also stored in memory area 307A as the indexing value associated with the data value $D_1$. A future read operation relating to address $ADDR_1$ will be directed to memory area 307A, and using address $ADDR_1$ as the indexing value, the data value $D_1$ can be located and read. Thus all read operations relating to data values that have been stored in memory area 307A will be read from memory device 307, whereas read operations directed to any of the initial parameters stored in memory 306A will not be found in memory area 307A, and will instead be forwarded to the memory area 306A.

Figure 4B:
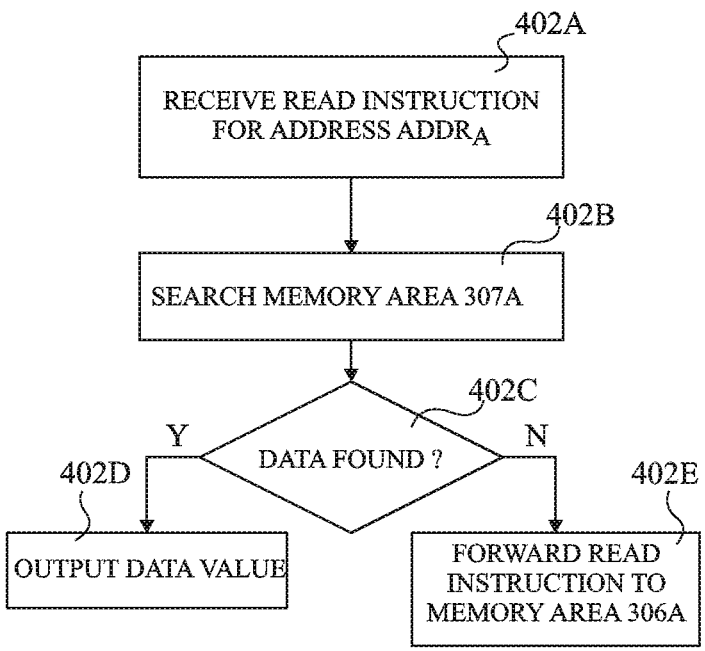
FIG. 4B is a flow diagram showing operations for implementing a read instruction according to an embodiment of the present disclosure.

FIG. 4B illustrates an example of operations performed by the memory device 307, during the execution of the computing function of operation 402 of FIG. 4A, in response to a read instruction received from the processing device 302 of FIG. 3.

In a first operation 402A, a read instruction for an address $ADDR_A$ of memory area 306A is received by the memory device 307.

In a subsequent operation 402B, the memory device 307 is searched, using the address $ADDR_A$ as an indexing value.

In a subsequent operation 402C, it is determined whether or not the indexing value $ADDR_A$ generated a hit in memory device 307. If so, the next operation is 402D, in which the data value associated with this indexing value in memory area 307A is provided as the output to the processing device 302. Alternatively, if the indexing value $ADDR_A$ was not found, the next operation is 402E, in which the read instruction is forwarded to memory device 306.

Thus the intermediate memory area 307A provides a memory space in which data may be written and read during the first execution of the computing function, while the initial parameters can be read from the memory area 306A but are not overwritten.

Referring again to FIG. 4A, in a subsequent operation 404, the execution of the computing function is repeated by calling the computing function a second time, but this time with the intermediate memory disabled, for example by a disable signal on line 319. When disabled, all memory operations received by the intermediate memory device 307 are for example forwarded directly to the memory device 306. This means that the initial parameters used during the first and second executions of the computing function are the same, and in the absence of faults, the second execution of the computing function should be an identical repetition of the first execution. In one example, the final state stored in the memory area 307A following the first execution of the computing function is not overwritten during the second execution. The memory area 306A provides the execution space during the second execution of the computing function, and once this second execution is completed, the memory area 306A stores the final state.

In a subsequent operation 406, the results of two executions of the computing function are compared. For example, it is verified that the data value stored at each address in the memory area 307A is identical to the data value of the corresponding address of the memory area 306A. Discrepancies between corresponding data values in the memory areas 306A, 307A could indicate the injection of a fault in one of these memories, in the processing device, or in the instruction memory 304. If the verification indicates the presence of a fault, a countermeasure may be taken, such as resetting the processing device, erasing the memory areas 306A, 307A, and/or incrementing a count value leading to a permanent deactivation of the processing device if a certain number of faults is detected.

Figure 5:
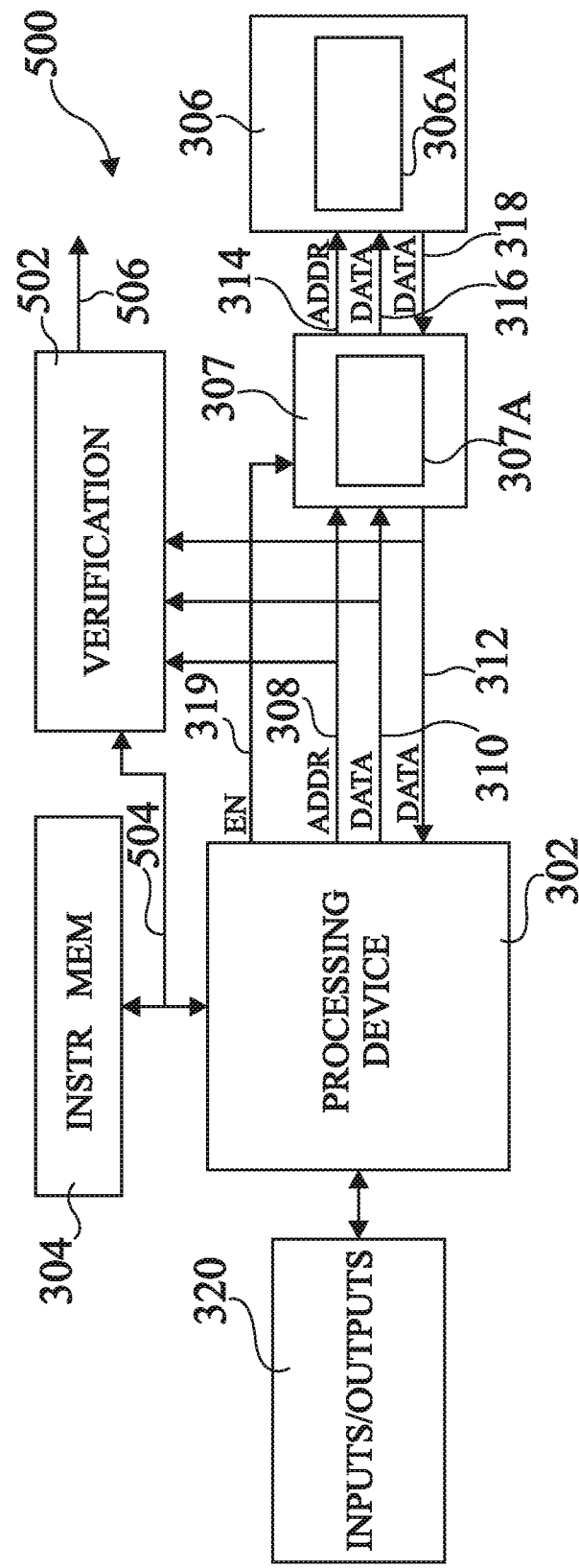
FIG. 5 illustrates a computing device according to yet a further embodiment of the present disclosure.

FIG. 5 illustrates a computing device 500 according to an alternative embodiment. Device 500 comprises many elements in common with computing device 300 of FIG. 3, and those elements have been labeled with like numerals and will not be described again in detail.

Device 500 comprises a verification block 502 coupled to receive the address and data values transmitted on lines 308, 310 and 312 between the processing device 302 and the intermediate memory device 307. Furthermore, the verification block 502 may also receive instruction data from the instruction memory 304 on a line 504, which is coupled to the connection between the instruction memory 304 and the processing device 302. Thus the verification block 502 for example receives a copy of all instructions loaded to the processing device 302 during the execution of the computing functions. The verification block 502 records the data from these various sources by calculating a checksum value, for example equal to the sum of all of the values it receives. For example, assuming that the data values are n-bit values, the sum could be calculated as the sum, modulo n, of the data values and address values. The value of n could for example be between 8 and 64 bits. The verification block 502 for example calculates a first checksum during the first execution of the computing function, and a second checksum during the second execution of the computing function, and compares these checksums to verify that they match. If they do not match, this would imply the injection of a fault in one of the memories 304, 306, 307 or into the processing device 302 during the first or second execution.

Figure 6:
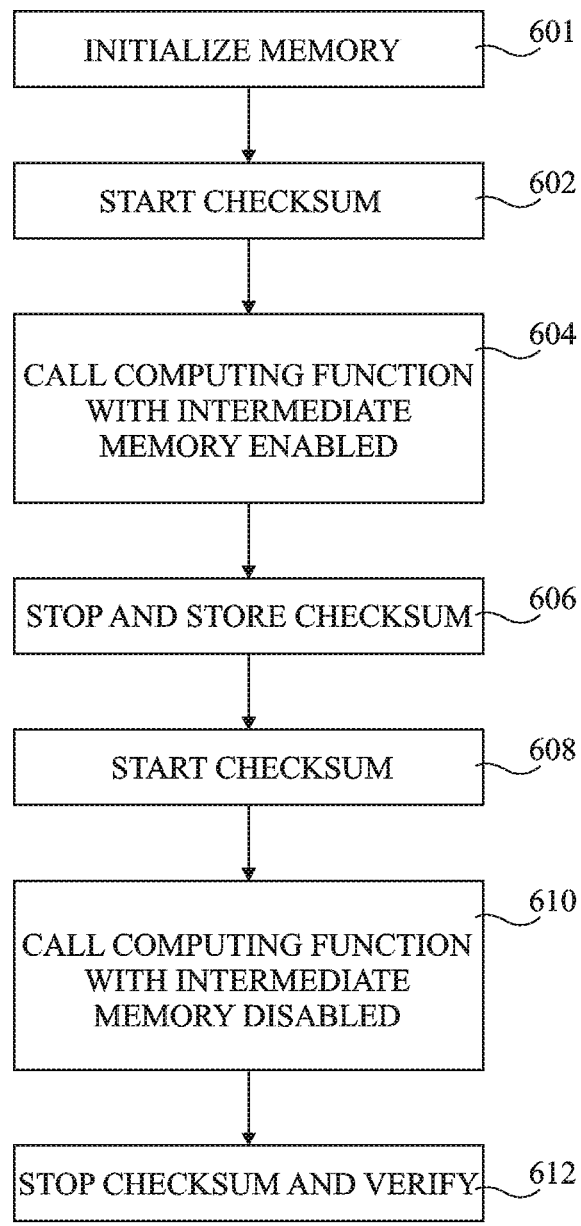
FIG. 6 is a flow diagram showing operations in a method according to a further embodiment of the present disclosure.

A modified operation flow based on the use of the verification block 502 will now be described with reference to the flow diagram of FIG. 6. The operations of FIG. 6 are for example implemented under the control of the processing device 302.

In a first operation 601, the memory 306 is initialized. In particular, as described above with reference to operation 401 of FIG. 4A, initial parameters to be used during the execution of the computing function are loaded in the memory area 306A.

Then, in a subsequent step 602, the checksum implemented by the verification block 502 is started, such that from this moment on, all the data signals and the address signals provided on the lines 308 to 312, and optionally the instructions from the instruction memory 304, are summed.

In a subsequent operation 604, in a similar manner to operation 402 of FIG. 4A, the computing function is called with the intermediate memory 307 enabled. Thus the memory area 307A is used as the execution space, and only read operations relating to the initial parameters are forwarded to the memory device 306.

In subsequent operation 606, the calculation of the checksum by the verification block 502 is stopped, and the value reached is for example stored for future verification.

In a subsequent operation 608, the checksum is activated again in preparation for the second execution of the computing function.

In a subsequent operation 610, the execution of the computing function is repeated by calling it a second time. As with operation 404 of FIG. 4A, the intermediate memory device 307 is disabled during the second execution during operation 610. Thus, during the second execution, all memory operations received by the intermediate memory device 307 are for example forwarded directly to the memory device 306.

The calculation by the verification block 502 of the checksum during the second execution of the computing function could be implemented in a number of different ways. One option, assuming that the first checksum calculated during the first execution has been transferred to a separate register/memory, would be to simply reset the register used to accumulate the checksum, and to calculate the second checksum in this register. Alternatively, the verification block 502 may comprise two registers, a first of which is used to accumulate and store the checksum during the first execution of the computing function, and a second of which is used to accumulate and store the checksum during the second execution of the computing function. As a further option, the first checksum could be calculated by an addition of all the data/address/instruction values received, and the result could remain in the same register after the first execution of the computing function. Then, during the second execution of the computing function, the data values received by the verification block 502 could be subtracted from the first checksum such that the value in the checksum register would equal zero by the end of the second execution if no faults are present.

A subsequent operation 612 of FIG. 6 involves stopping the checksum and verifying the value, for example by comparing the first and second checksums and verifying that they are equal. As previously, if the verification of the checksum indicates the presence of a fault, a countermeasure may be taken, such as resetting the processing device, erasing the memory devices 306, 307 and/or incrementing a count value leading to a permanent deactivation of the processing device 302 if a certain number of faults is detected.

The memory devices 306, 307 could each be implemented by a RAM (Random Access Memory), such as an SRAM (Static RAM) or other type of volatile programmable memory device. Alternatively, the memory device 306 could be implemented by a non-volatile memory, such as for example an $E^2PROM$ (electronically erasable programmable read-only memory), as will now be described with reference to FIG. 7.

Figure 7:
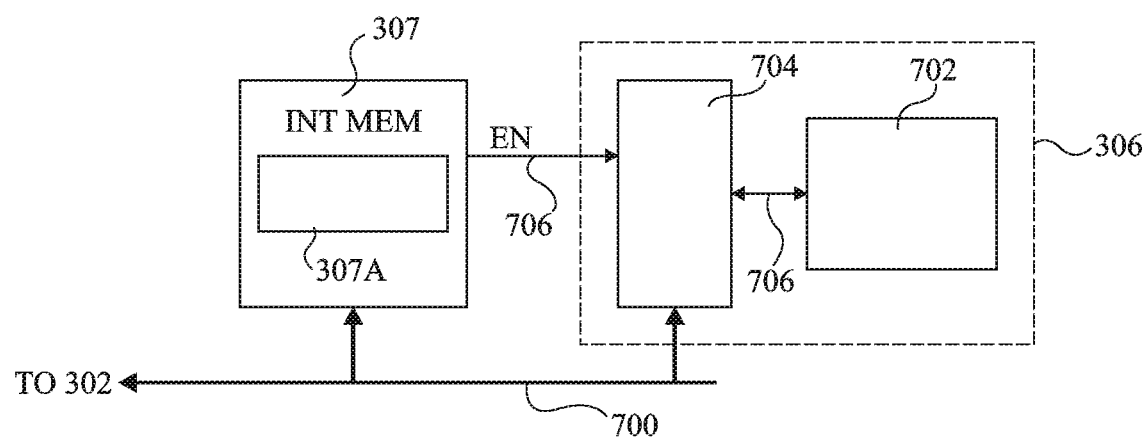
FIG. 7 illustrates a memory interface according to a further embodiment of the present disclosure.

FIG. 7 illustrates the memory device 306 and the intermediate memory device 307, each of which are coupled to a bus 700, which is also for example coupled to the processing device 302 (not shown in FIG. 7). Memory device 306 is a non-volatile memory comprising a non-volatile memory array 702, which receives control and data signals for read and write operations from a memory interface module 704 on control lines 706. The memory interface module 704 is coupled to the bus 700 for receiving the address and data signals corresponding to write and read operations, which it converts to a suitable format for the non-volatile memory array 702. An enable signal is for example provided on a line 706 from the intermediate memory device 307 to the memory interface 704, allowing the intermediate memory device 307 to control the activation of the non-volatile memory device 306.

During the first execution of the computing function, for example corresponding to operations 402 and 604 described above, the enable line 706 for example deactivates the non-volatile memory 306, and the intermediate memory 307 performs all read and write operations, unless they concern read operations of the initial parameters. For example, if the intermediate memory 307 receives a read operation request for an initial parameter not stored in its memory area 307A, it activates the memory interface module via line 706 so that the read operation is processed by the non-volatile memory 704 and the corresponding data is read from the array 702.

During the second execution of the computing function, for example corresponding to operations 404 and 610 described above, the enable line 706 for example activates the non-volatile memory 306, and the non-volatile memory performs all read and write operations.

An advantage of the embodiments described herein is that the execution of a computing function may be repeated with the use of relatively low memory resources. In particular, the initial parameters are stored only once during the first execution of the computing function, thereby economizing memory space. Furthermore, the use of a checksum avoids saving the entire final state generated during the first execution of the computing function.

Having thus described a number of embodiments, various alterations, modifications and improvements will readily occur to those skilled in the art.

For example, it will be apparent to those skilled in the art that the particular hardware implementation of the embodiments described herein will depend of the particular application, and could include separate memory devices or a single memory device containing the memory areas 306A, 307A and the instruction memory 304. Furthermore, the particular control of the memory device(s) during read and write operations will depend on the types of memory used.

It will also be apparent to those skilled in the art that various different checksum algorithms could be used to compute the checksums, a simple addition of the values being just one example. Furthermore, the checksum could be implemented by a cyclic redundancy check.

The operations of the various flow diagrams of FIG. 4A, 4B and 6 may be implemented entirely by software executed by the processing device 302 of FIG. 3, although certain operations, such as enabling or disabling the memory devices 306 and/or 307 and comparing results/checksums may be implemented by a state machine, for example forming part of the processing device 302.

Furthermore, the various features described in relation to the various embodiments could, in alternative embodiments, be combined in any combination.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computing device, comprising:
   an electronic hardware-based processing device;
   a first memory device configured to store one or more initial parameters; and
   a second memory device coupled to said electronic hardware-based processing device and to said first memory device;
   wherein said electronic hardware-based processing device is configured for detecting fault attacks by steps including:
      performing, a first execution of a computing function based on said one or more initial parameters and perform a second execution of the computing function based on said one or more initial parameters;
      reading, during said first execution of the computing function, said one or more initial parameters from said first memory device;
      generating, via said first execution of the computing function, one or more modified values of at least one of said one or more initial parameters; and
      storing, during said first execution of the computing function, in response to a write operation targeting a memory address of said one or more initial parameters in said first memory device, and without determining a fault attack, said one or more modified values in said second memory device.

2. The computing device of claim 1 wherein, before reading said one or more initial parameters from said first memory device during said first execution of said computing function, said electronic hardware-based processing device is configured to search said second memory device for modified values of said one or more initial parameters.

3. The computing device of claim 1 wherein said electronic hardware-based processing device is configured to read, during said second execution of said computing function, said one or more initial parameters from said first memory device and wherein said electronic hardware-based processing device is configured to store, during said second execution of said computing function, said one or more modified values in said first memory device.

4. The computing device of claim 1 wherein said second memory device comprises:
   an enable input coupled to said electronic hardware-based processing device, and wherein said second memory device is configured to forward, when disabled, all write and read instructions to said first memory device.

5. The computing device of claim 1 wherein said second memory device is configured to receive, during said second execution of said computing function, read instructions from said electronic hardware-based processing device and wherein said second memory device is configured to forward said read instructions to said first memory device if said read instructions relate to one of said initial parameters.

6. The computing device of claim 1, further comprising:
   a verification block adapted to compare at least one value generated during said first execution of said computing function with at least one value generated during said second execution of said computing function.

7. The computing device of claim 6 wherein said verification block implements a checksum function.

8. The computing device of claim 6 wherein said at least one value generated during said first execution of said computing function includes an incrementing count value and at least one value generated during said second execution of said computing function includes a decrementing count value.

9. A computing device method, comprising:
   storing initial parameters in a first memory of a hardware-based electronic device; and
   processing, by an intermediate memory device of the hardware-based electronic device, at least some read commands directed toward the first memory, wherein said processing by the intermediate memory device memory includes:
      when data corresponding to a read address in a read command directed toward the first memory is stored in the intermediate memory device, retrieving the data corresponding to the read address from the intermediate memory device; and
      when data corresponding to the read address in the read command directed toward the first memory is not stored in the intermediate memory device, passing the read command to the first memory;
   detecting a fault attack, wherein detecting the fault attack includes:
      performing a first execution of a computing function using the initial parameters stored in the first memory to generate modified values of the initial parameters;
      storing said modified values of the initial parameters produced by the first execution of the computing function in a second memory device without determining a fault attack; and performing a second execution of the computing function using the initial parameters stored in the first memory.

10. The computing device method according to claim 9, comprising:
   comparing the modified values produced by the first execution of the computing function with modified values produced by the second execution of the computing function; and
   determining whether or not a fault occurred based on the comparing.

11. The computing device method according to claim 9, comprising:
   enabling the intermediate memory device during the first execution of the computing function; and
   disabling the intermediate memory device during the second execution of the computing function.

12. The computing device method according to claim 9, comprising:
   performing a first running checksum operation during the first execution of the computing function;
   performing a second running checksum operation during the second execution of the computing function; and
   detecting a fault based on the second running checksum operation.

13. The computing device method according to claim 9 wherein every read command directed toward the first memory is first processed by the intermediate memory device.

14. An apparatus, for detecting fault attacks, comprising:
   a hardware-based processing device configured to perform a first execution of a computing function based on one or more initial parameters and a second execution of the computing function based on the one or more initial parameters, the computing function configured to generate one or more modified values of at least one of the initial parameters;
   an intermediate memory means coupled to the hardware-based processing device for storing at least some of the one or more modified values without determining a fault attack; and
   a first memory means coupled to the hardware-based processing device via the intermediate memory means, the first memory means for storing the one or more initial parameters, wherein read commands directed toward addresses in the first memory means are passed through the intermediate memory means and wherein the intermediate memory means intercepts the read commands based on a read address embedded in a read command.

15. The apparatus according to claim 14, comprising:
   an enable means coupled to the intermediate memory means for enabling the intermediate memory means during the first execution of the computing function and for disabling the intermediate memory means during the second execution of the computing function.

16. The apparatus according to claim 14, comprising:
   a verification circuit arranged to detect a difference between first modified values generated during the first execution of the computing function and second modified values generated during the second execution of the computing function.

17. The apparatus according to claim 16 wherein the verification circuit is arranged to perform a checksum operation.

18. The apparatus according to claim 17 wherein the checksum operation includes a cyclic redundancy check operation.

19. The apparatus according to claim 14 wherein in association with the first execution of the computing function, the initial parameters are retrieved from the first memory means and the one or more modified values generated by the first execution of the computing function are stored in the intermediate memory means and in association with the second execution of the computing function, the initial parameters are retrieved from the first memory means and the one or more modified values generated by the second execution of the computing function are not stored in the intermediate memory means.

20. The apparatus according to claim 19 wherein the one or more modified values generated by the first execution of the computing function are stored in the intermediate memory means in response to a write operation targeting a memory address in the first memory means.

* * * * *